United States Patent
Kuroda (10) Patent No.: US 7,532,421 B2
(45) Date of Patent: May 12, 2009

(54) SERVO DEMODULATING CIRCUIT AND METHOD

(75) Inventor: Sumio Kuroda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 103 days.

(21) Appl. No.: 11/594,541

(22) Filed: Nov. 8, 2006

(65) Prior Publication Data

US 2007/0273992 A1 Nov. 29, 2007

(30) Foreign Application Priority Data

May 24, 2006 (JP) ............................. 2006-144421

(51) Int. Cl.
*G11B 20/08* (2006.01)

(52) U.S. Cl. ........................................ 360/29

(58) Field of Classification Search ................ 360/29, 360/51, 39, 48, 49, 60, 75; 375/376
See application file for complete search history.

(56) References Cited

U.S. PATENT DOCUMENTS

| | | | | |
|---|---|---|---|---|
| 4,587,579 | A * | 5/1986 | Cocke et al. | 360/75 |
| 6,014,276 | A * | 1/2000 | Takase | 360/49 |
| 6,226,139 | B1 * | 5/2001 | Yada | 360/51 |
| 6,335,843 | B2 * | 1/2002 | Yotsuya et al. | 360/60 |
| 6,381,292 | B1 * | 4/2002 | Yamakoshi | 375/376 |
| 6,515,815 | B2 * | 2/2003 | Yotsuya et al. | 360/60 |
| 7,203,014 | B2 * | 4/2007 | Kuroda et al. | 360/48 |

OTHER PUBLICATIONS

Kiminori Sato et al. "Magnetic Transfer Technique"; Fuji Electric Journal, vol. 75, No. 3, pp. 173-177, 2002 (including English translation).

* cited by examiner

*Primary Examiner*—Fred Tzeng
(74) *Attorney, Agent, or Firm*—Fujitsu Patent Center (57) ABSTRACT

Servo demodulation is performed by appropriately compensating for demodulation errors caused by fluctuation of the replayed signal amplitude of a phase servo pattern. A servo demodulating circuit comprises single waveform sampling means for reading into a register a single waveform of a servo burst signal included in a phase servo signal based on a sampling clock synchronized by clock synchronization means, single waveform digitizing means for calculating an amplitude value of the single waveform of the servo burst signal from peak and bottom of the single waveform of the servo burst signal read into the register, and for standardizing a value of the register based on an amplitude value of the single waveform of the servo burst signal, and phase information calculation means for calculating phase information of the single waveform of the servo burst signal based on the value of the register standardized by the waveform digitizing means.

12 Claims, 10 Drawing Sheets

F I G. 8A  MEDIUM

F I G. 8B  MASTER DISK
MEDIUM

SERVO DEMODULATING CIRCUIT AND METHOD

BACKGROUND OF THE INVENTION

1. Field of the Invention

The present invention relates to a servo demodulating circuit and method of a magnetic transfer medium.

2. Description of the Related Art

The conventional method of writing servo information (servo patterns) of a magnetic disk onto a disk operates by using a servo track writer (STW). In such a method, for example, the servo write time for a 20 Gb/disk-class magnetic disk requires approximately 10 minutes/disk. Since there has been a current trend of ever increasing track recording density in the magnetic disks, the time required for servo writing by STW has become longer, causing significant cost problems.

In light of the problems with STW, a method has been proposed as a new technique for recording servo information in patterns in a master disk and storing the information by magnetic transfer.

An example of the magnetic transfer method is, as described in Non-patent Document 1, a method for forming a magnetic film by making a fine asperity pattern on the master disk and generating a pattern by magnetic transfer. The time required for magnetic transfer to one magnetic disk is far shorter than the execution time of STW by the conventional method.

For commercial production of patterned media and discrete track media, due to production cost concerns and writing time length, it is difficult to perform electron beam lithography on every disk. Therefore, it is more realistic to manufacture these media via molds, such as nanoimprinting, which is suitable to a desired pattern.

Figure 1:
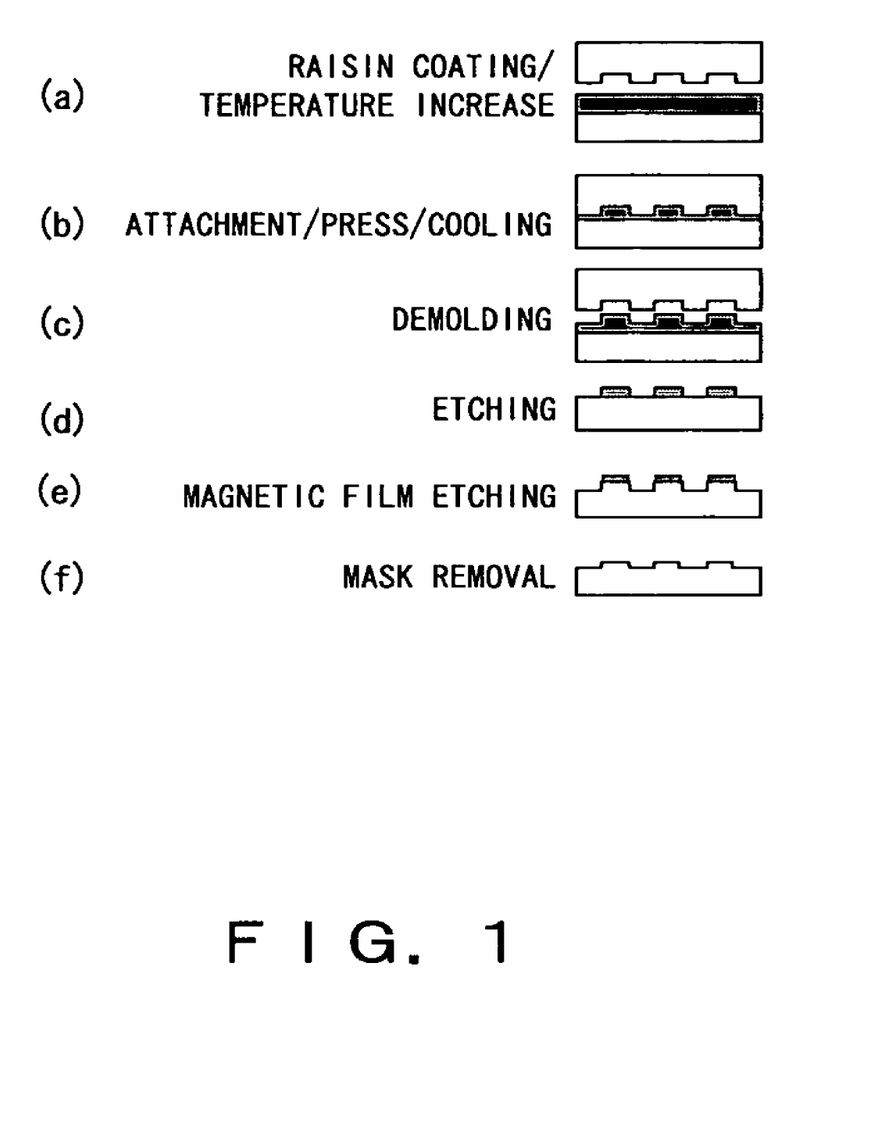
FIG. 1 is a diagram showing a disk formation method by a nanoimprinting process relating to the prior technology.

FIG. 1 shows a heating nanoimprinting process relating to the prior technology. Specifically, a medium is produced by the steps below: (a) increasing the temperature of a disk on which a magnetic film is formed by coating the disk with resin such as polymethylmethacrylate (PMMA) resin by, for example, a spin coating method, (b) attaching and pressing a mold, prepared in advance and generated by electron beam lithography (EM lithography) against a disk by using a nanoimprinting apparatus and softening the resin coating through the application of heat, (c) cooling, afterwards, to room temperature and demolding the disk (detaching the disk from the mold), (d) etching the excessive resin on the disk with oxygen gas using a reactive ion etching (RIE) apparatus, (e) further etching the magnetic film by gas, and finally (f) removing the mask and attaching a protection film. During the process of etching the magnetic film, in order to preserve the etching's stability, etching via intermediate layer rather than via the PMMA resin is also proposed.

[Non-Patent Document 1]

"Magnetic Printing Technology", Fuji Electric Journal, vol. 75, No. 3, 2002, pp. 173-177

In a conventional method using STW, the signal amplitude of the recorded servo pattern is uniform. In the magnetic transfer method described in the above Non-Patent Document, however, the extent of attachment between the master disk and a slave medium (magnetic spacing) directly influences the intensity of magnetic attraction (measure of magnetization), and thus several nanometers (nm) of difference in the height of asperity on the master disk or minute surface roughness of the slave medium would cause fluctuation of the replayed signal amplitude, creating a problem involving insufficient signal quality.

When demodulating a servo signal, a system correcting the sensitivity of the head or the sensitivity of the medium by auto gain control (AGC) or a system absorbing the fluctuation of the signal amplitude caused by the difference in recording density between the inner circumference and the outer circumference of the disk is employed. There is a problem, however, such that in a case of a magnetically transferred signal, if the above amplitude fluctuation is present in a sector, all of the fluctuation will result in demodulation errors.

A further problem exists such that when performing, in the conventional method, the magnetic transfer to the perpendicular magnetic recording medium, magnetization is not likely to be even, causing a significant demodulation error.

When employing the above nanoimprinting method, the edge of the PMMA resin may be chipped in the demolding process illustrated in FIG. 1C, or the convex portion of the mold may have a concentrated electrical field, creating variations in the edges in magnetic film etching process illustrated in FIG. 1E. The occurrence of such events causes a problem in which the edge positions are misaligned, resulting in phase fluctuation caused by amplitude fluctuation of the replayed signal.

SUMMARY OF THE INVENTION

It is an object of the present invention to compensate and reduce amplitude fluctuation in a demodulated signal and demodulation errors due to phase fluctuation caused by the amplitude fluctuation during the servo demodulation.

According to the present invention, a servo demodulating circuit is provided in an apparatus for demodulating servo information of a magnetic disk medium recording a phase servo signal by a magnetic transfer method, comprising a phase information calculation unit for calculating waveform phase information after standardizing the signal amplitude of a servo burst signal included in the phase servo signal in units of waveforms.

The present invention also provides a servo demodulating circuit in an apparatus for demodulating servo information of a magnetic disk medium recording a phase servo signal by a magnetic transfer method, comprising a register, an auto gain control unit for performing auto gain control of the magnetic disk medium based on the preamble of the phase servo signal, a clock synchronization unit for synchronizing the clock of the magnetic disk medium with that of the apparatus based on the preamble of the phase servo signal, a single waveform sampling unit for reading into the register a single waveform of a servo burst signal included in the phase servo signal based on the sampling clock synchronized by the clock synchronization unit, a single waveform digitizing unit for calculating the amplitude value of the single waveform of the servo burst signal from peak and bottom of the single waveform of the servo burst signal read into the register, and for standardizing a value of the register based on an amplitude value of the single waveform of the servo burst signal, and a phase information calculation unit for calculating phase information of the single waveform of the servo burst signal based on the value of the register standardized by the waveform digitizing unit.

Additionally, the present invention provides a magnetic disk apparatus comprising a medium recording the phase servo signal by a magnetic transfer method, and the above servo demodulating circuit.

Furthermore, the present invention provides a servo demodulating method performed in an apparatus for demodulating servo information of a magnetic disk medium recording a phase servo signal by a magnetic transfer method, comprising a step of performing clock synchronization between the magnetic disk medium and the apparatus based on the phase servo signal, a step of reading into a register, a single waveform of a servo burst signal included in the phase servo signal based on the clock, a step of calculating an amplitude value of the single waveform of the servo burst signal from peak and bottom of the single waveform of the servo burst signal read into the register, a step of standardizing a value of the register based on an amplitude value of the single waveform of the servo burst signal, and a step of calculating phase information of the single waveform of the servo burst signal based on the standardized value of the register.

By employing the servo demodulating circuit or method relating to the present invention, it is possible to solve the problems of amplitude fluctuation of the replayed signal due to the above causes and demodulation error caused by the phase fluctuation.

DESCRIPTION OF THE PREFERRED EMBODIMENT

In the following description, although details of the embodiments of the present invention are set forth with reference to the drawings, it does not limit the present invention. It should be noted that the term "(magnetic recording) medium" in the description represents a perpendicular magnetic recording medium, a planar magnetic recording medium and other media known to a person skilled in the art unless otherwise provided.

[Overview of Servo Demodulating Apparatus Relating to Embodiments of Present Invention]

Figure 2:
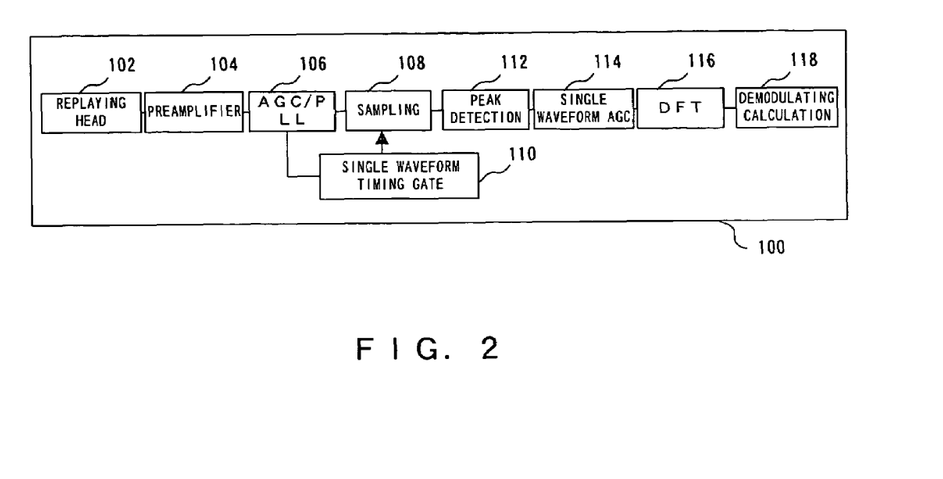
FIG. 2 is a diagram showing an overview of a servo demodulating apparatus relating to the embodiments of the present invention.

FIG. 2 shows an overview of a servo demodulating circuit 100 relating to the embodiments of the present invention.

The servo demodulating circuit 100 comprises an auto gain control means/phase-locked loop (AGC/PLL) 106, waveform sampling means 108, a single waveform timing gate 110, a peak detection means 112, single waveform AGC means 114, discrete Fourier transform (DFT) means 116, and a demodulating calculation means 118. Note that in the drawing, although a replaying head 102 and a preamplifier 104 are described as being included in the circuit for convenience, a configuration in which the replaying head and the preamplifier input and output from outside of the servo demodulating circuit 100 is also possible.

A replayed signal is transmitted to the preamplifier 104 from the replaying head 102, replaying the phase servo signal of a medium (not shown), and amplification of the signal is performed. Next, based on the preamble of the amplified signal, the AGC/PLL means 106 performs auto gain control for adjusting sensitivity of the head or the medium to adjust the amplitude level of the signal. At the same time, the AGC/PLL means 106 performs, based on the preamble of the amplified signal, clock synchronization of the medium and the circuit 100 by PLL to adjust the clock timing. Afterwards, the waveform sampling means 108 and the single waveform timing gate 110, based on the sampling clock synchronized by the AGC/PLL means 106, cause a register (not shown) to read a single waveform of the servo burst signal contained in the phase servo signal.

In addition, the peak detection means 112 and the single waveform AGC means 114 digitize a single waveform of the servo burst signal, read by the register, at a clock timing. An amplitude value is calculated from the peak and the bottom of the single waveform read by the register in order to standardize the values in the register.

The DFT means 116 performs DFT processing of each of the digitized waveforms and calculates the phase value of each waveform. An example of the DFT operation equation used in the DFT means 116 is provided below as an equation (1):

$$X(k) = \sum_{n=0}^{m-1} x(n)\cos\left(\frac{2\pi}{m}kn\right) - j\sum_{n=0}^{m-1} x(n)\sin\left(\frac{2\pi}{m}kn\right) \quad (1)$$

Here, m in the equation is the sampling number of waveform(s) in one period, x(n) is the $n^{th}$ sample value when sampling the waveform for one period, k is an integer in a range from 0 to m−1, and X(k) is a $k^{th}$ Fourier coefficient. Note that j is an imaginary unit. The imaginary part of X(k) divided by the real part is the value of arc tangent, and it is a phase spectrum. Using the information, the $k^{th}$ phase value can be obtained. Here, because the replayed waveform is assumed to be a sine wave, the phase value can be calculated from delay of the sample point.

Based on the phase value, the demodulation calculation means 118 calculates track position information, converts the amount of demodulation error into electrical current, and performs positioning of the head actuator.

[Detailed Explanation of Demodulation Error]

Figure 3:
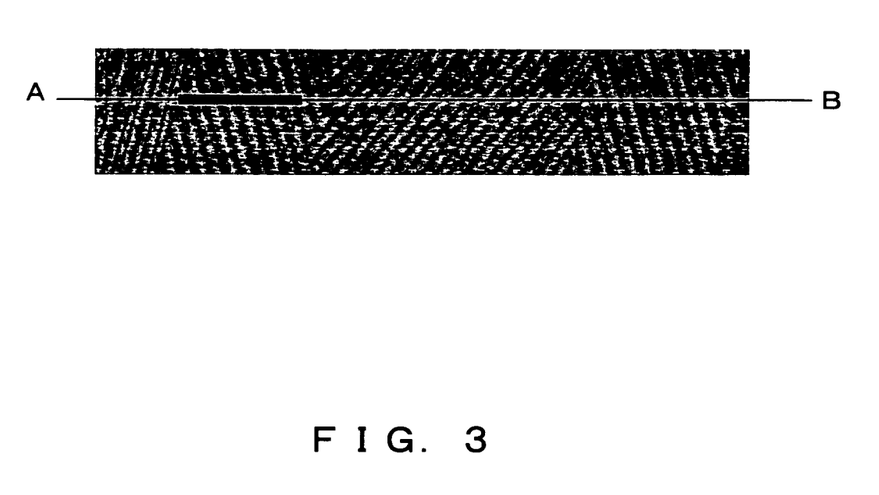
FIG. 3 is a picture, using a magnetic force microscope, of a phase servo pattern on the magnetic recording medium.

FIG. 3 shows a picture, taken by a magnetic force microscope (MFM), of a phase servo pattern. Here, the picture clearly shows that the phases alternate. When performing servo demodulation, the pattern and the clock are synchronized with each other in the preamble (not shown). The replayed waveform is sampled after multiplying the synchronized clock, and afterwards each waveform is demodulated at the same phase value of 30°, for example.

Figure 4:
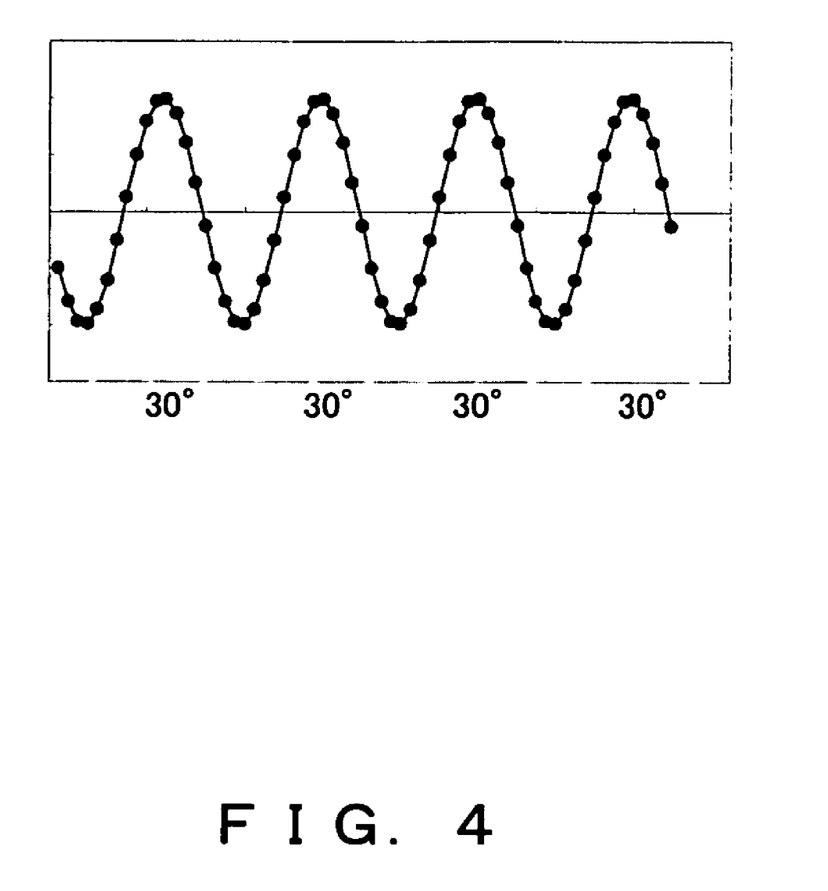
FIG. 4 is a replayed oscilloscope waveform at cross line A-B of FIG. 2, indicating the demodulated value in a case where the phase servo pattern recorded by STW.
Figure 5:
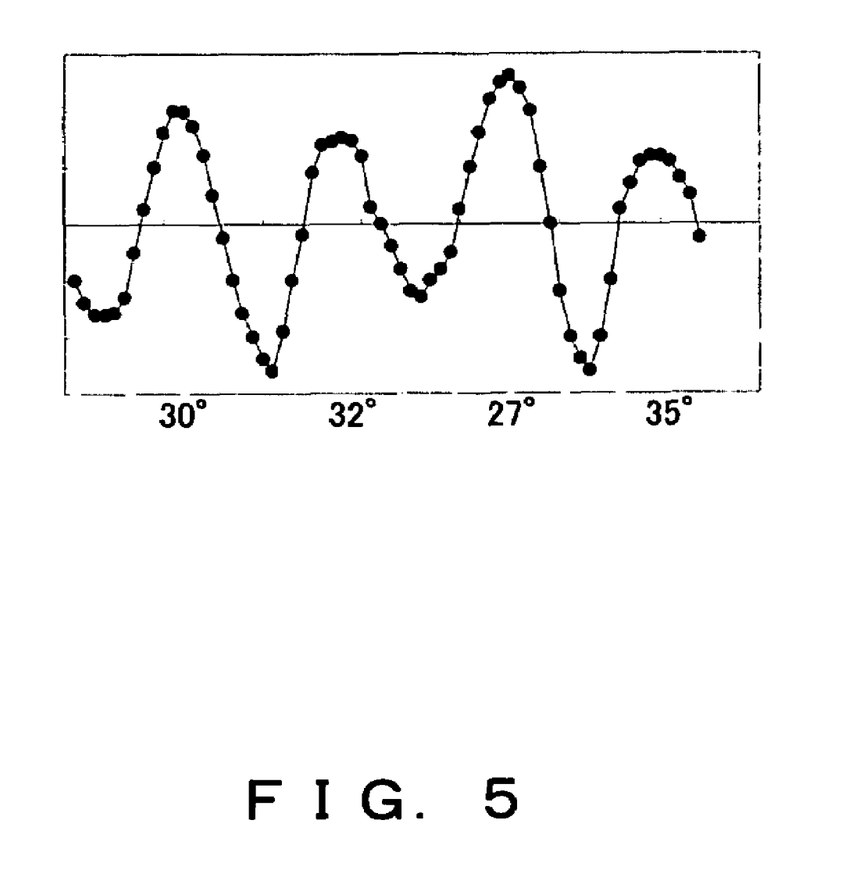
FIG. 5 is a replayed oscilloscope waveform at cross line A-B of FIG. 2, indicating the demodulated value in a case in which the phase servo pattern is recorded by magnetic transfer method.

As an example of the above replayed waveform (with the focus on a replayed waveform of a section indicated by a bold black line of a cross line A-B in FIG. 3) the phase servo pattern recorded by STW is shown in FIG. 4, the phase servo pattern recorded by magnetic transfer is shown in FIG. 5. In this case, time is on the horizontal axis and voltage is on the vertical axis. In this example, 16 samples are obtained within one period, and when the equation used in this example is the above equation (1), the following equation (2) is obtained:

$$X(k) = \sum_{n=0}^{15} x(n)\cos\left(\frac{\pi}{8}kn\right) - j\sum_{n=0}^{15} x(n)\sin\left(\frac{\pi}{8}kn\right) \quad (2)$$

Notations in this equation are the same as that of the above equation (1).

In oscilloscope waveforms (STW) of FIG. 4, the phase values are the same (30°) for each of the waveforms.

However, oscilloscope waveforms of FIG. 5 (obtained by magnetic transfer), may have the demodulated values of 30°, 32°, 27°, and 35°, showing that the original phase values are not demodulated. As described above, in a phase servo, based on the assumption that the replayed signal has a sine waveform, the amplitude fluctuation is recognized as phase fluctuation. Thus, when the demodulated phase value is different for each waveform, the difference is the phase error, influencing the tracking accuracy.

In the servo demodulating circuit and method related to this embodiment of the present invention, by standardizing the measure of the signal for each peak (a single waveform), a calculation equivalent to the calculation of the waveforms having uniform phases as in FIG. 4 is possible. By increasing the number of samples in a single waveform, it is possible to detect further peaks properly, and to perform servo demodulation further accurately.

[Operation of Servo Demodulating Circuit of Embodiment of Present Invention]

Figure 6:
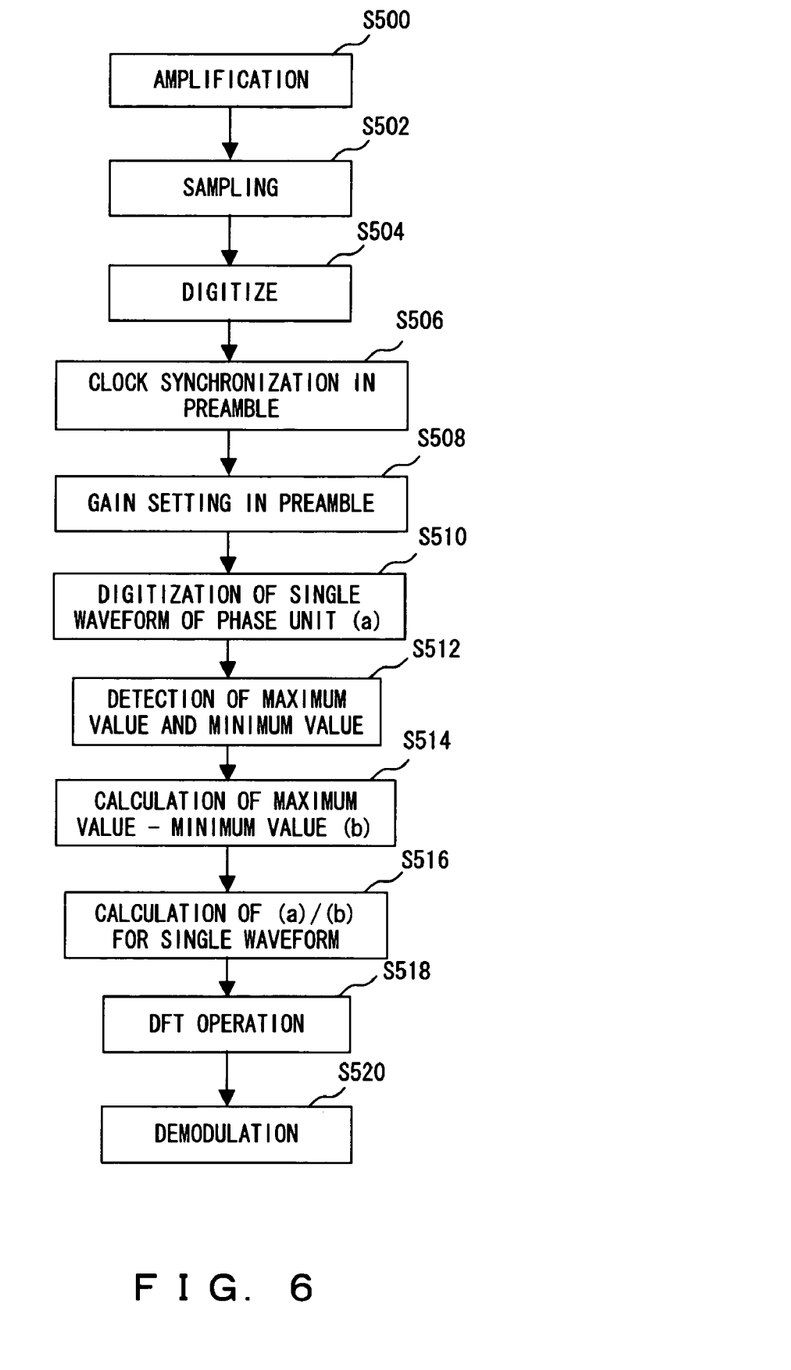
FIG. 6 is a flowchart describing the operations of the servo demodulating circuit relating to an embodiment of the present invention.

FIG. 6 shows a flowchart describing the operations of the servo demodulating circuit relating to the embodiment of the present invention.

First, a phase servo pattern is replayed by a replaying head, then the replayed signal is amplified in a preamplifier unit (step S500), sampling (step S502) and digitizing (step S504) are conducted, and the replayed signal is stored in a register.

Next, using the preamble contained in the digitized replayed waveform stored in the register, clock synchronization (step S506) and gain setting (step S508) are performed.

Afterwards, a single waveform of the servo burst signal of the replayed signal of phase servo is read into a register, the waveform is digitized (step S510) (a), the maximum and minimum values are detected (step S512), and the detected minimum value is subtracted from the maximum value (step S514) (b).

A Single waveform is standardized by dividing the above value (a) of FIG. 6 by the above value (b) of FIG. 6 (step S516). Additionally, DFT operation is performed (step S518), and based on the result, the servo demodulation is conducted (step S520).

Figure 7:
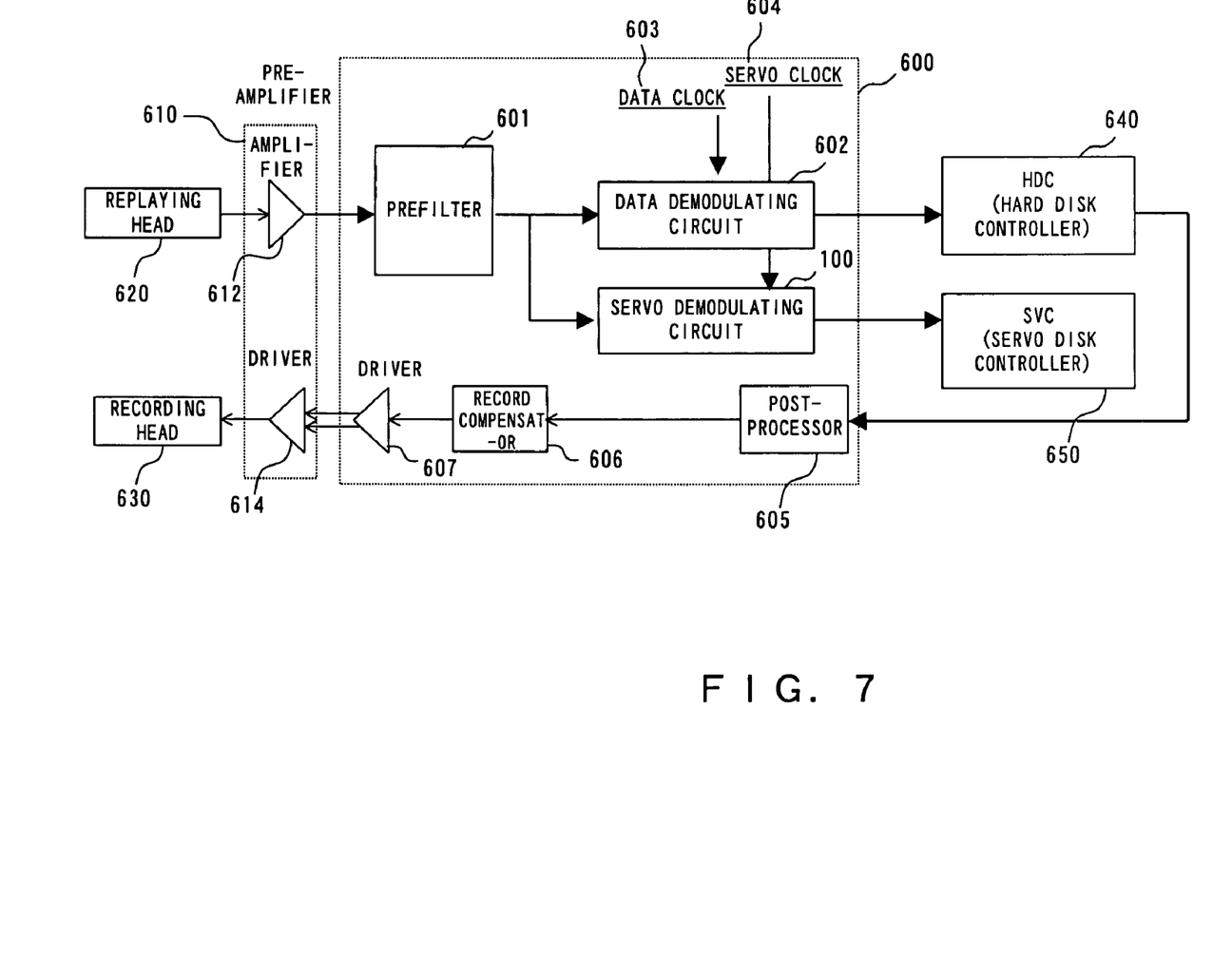
FIG. 7 is a diagram of an overview of the configuration of the apparatus comprising the servo demodulating circuit relating to an embodiment of the present invention.

FIG. 7 illustrates an overview of an example of the servo demodulating apparatus comprising the servo demodulating circuit 100 relating to this embodiment of the present invention. This is merely an example of a case of using a hard disk as a medium, and the present invention is not limited to this configuration.

In this embodiment, the servo demodulating apparatus comprises a servo demodulating unit 600, a preamplifier unit 610, a replaying head 620 and recording head 630 of the hard disk, a hard disk controller (HDC) 640 and a servo controller (SVC) 650 of a hard disk drive.

The overview of the operations of the servo demodulating apparatus relating to this embodiment is as follows. The replayed signal of the phase servo pattern from the replaying head 620 is input to the servo demodulating unit 600 via the preamplifier unit 610 and output to HDC 640 and SVC 650 after processing. Afterwards, HDC 640 calculates track position information and provides feedback to the servo demodulating unit 600, and the recording head 630 performs positioning. At the same time, SVC 650 performs servo demodulation.

The servo demodulating unit 600 comprises the above servo demodulating circuit 100, prefilter means 601, a data demodulating circuit 602, data clock means 603, servo clock means 604, a postprocessor 605, record compensation means 606, and a driver 607. An input from an amplifier 612 of the preamplifier unit 610 is transmitted to the data demodulating circuit 602 and the servo demodulating circuit 100 after being filtered by the prefilter means 601 and appropriately processed. In another embodiment, the data demodulating circuit 602 can have the same configuration as the servo demodulating circuit 100. In still another embodiment, the data demodulating circuit 602 and the servo demodulating circuit 100 can be one circuit having functions of both. The data clock means 603 and the servo clock means 604 are employed to synchronize the clocks of the data demodulating circuit 602 and the servo demodulating circuit 100 with the clock of the hard disk. The postprocessor 605 receives an output from HDC 640, calculates the amount of phase error, and transmits the amount of phase error to the record compensation means 606. The record compensation means 606 converts the amount of phase error into electrical current, and transmits the current to the recording head 630 via the driver 607 and the driver 614 of the preamplifier unit 610.

As described above, through appropriate operation of the recording head of the hard disk, it is possible to compensate for the phase error when performing the servo demodulation by the magnetic transfer method.

[Detailed Explanation of Demodulation Error of Perpendicular Recording Medium]

Figure 8A:
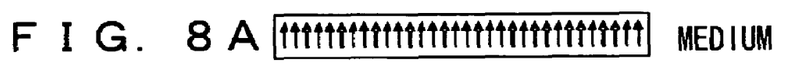
FIGS. 8A and 8B show a diagram indicating the magnetic transfer method of the perpendicular recording medium.
Figure 8B:
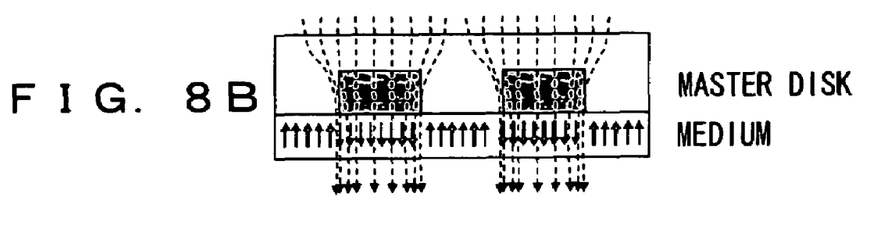

FIGS. 8A and 8B show a diagram explaining the details of the problem of demodulation error unique to a perpendicular recording medium. When performing magnetic transfer on a perpendicular recording medium, the medium is, first, initialized as in FIG. 8A. Next, a master disk, in which a ferromagnetic material is embedded, is attached to a part of the medium in which inversion of magnetization is desired, and a magnetic field is applied in a direction opposite to the direction of the initialization. Then, the magnetic bundle passes over the ferromagnetic material as shown in FIG. 8B. At that time, the magnetic bundles are concentrated in an edge part of the magnetic material.

Figure 9:
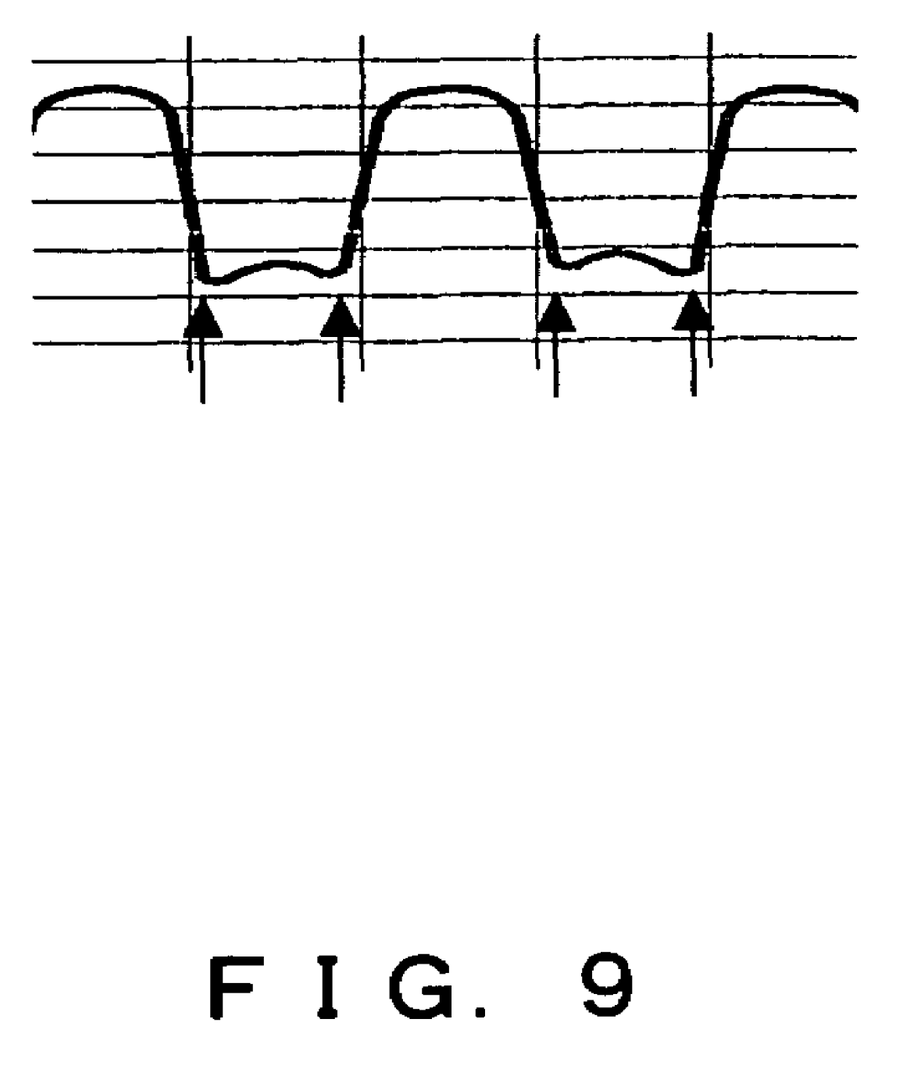
FIG. 9 is an example of the replayed waveform indicating the magnetizing after magnetic transfer of the perpendicular recording medium of FIG. 8.

FIG. 9 is an example of the replayed waveform indicating the magnetizing after magnetic transfer of the perpendicular recording medium of FIG. 8. The target an arrow indicates in FIG. 9 is a waveform of the edge part. The edge part has its position easily misaligned depending on how firmly the master disk and the perpendicular recording medium are attached at transfer. Therefore, if the waveform of FIG. 9 is demodulated when the servo pattern is present in the edge part, demodulation error increases. In an embodiment of the present invention, it is possible to comprise a limiter circuit in order to solve the problem.

Figure 10A:
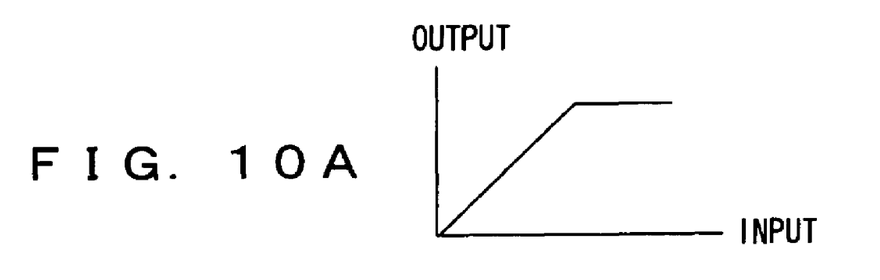
FIGS. 10A and 10B show a graph showing input and output of the limiter circuit relating to an embodiment of the present invention, and an example of the replayed waveform processed by the limiter circuit.
Figure 10B:
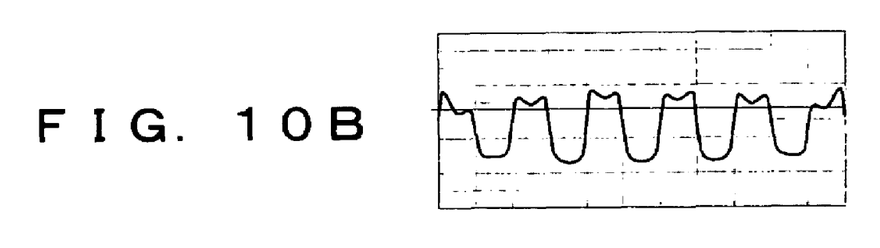

FIGS. 10A and 10B show a diagram explaining input and output of the above limiter circuit. The limiter circuit has a configuration such that the output is controlled so as to be kept at threshold or less when input exceeds a predetermined threshold, as in FIG. 10A, for example. By using the limiter circuit, noise having waveforms shown in FIG. 10B can be reduced. By incorporating waveform limiter means such as the above limiter circuit in the servo demodulating circuit relating to the present invention, it is possible to reduce noise and achieve a highly accurate reduction of demodulation error caused by the above phase fluctuation in the servo demodulation of the perpendicular recording medium.

By employing the servo demodulating apparatus or method relating to the present invention, it is possible to perform servo demodulation by appropriately compensating the demodulation errors caused by fluctuations of the replayed signal amplitude of a phase servo pattern.

What is claimed is:

1. A servo demodulating circuit in an apparatus for demodulating servo information of a magnetic disk medium recording a phase servo signal, comprising:
    a synchronizing clock circuit synchronizing a clock of the magnetic disk medium with that of an apparatus accessing the magnetic disk medium based on the phase servo signal;
    a sampler reading, into a register, a single waveform of a servo burst signal included in the phase servo signal based on the clock;
    an amplitude calculating circuit calculating, from peak and bottom of the single waveform, an amplitude value of the single waveform of the servo burst signal; and
    a phase calculating circuit calculating phase information of the single waveform after standardizing a value of the register based on the amplitude value of the single waveform of the servo burst signal.

2. The servo demodulating circuit according to claim 1, further comprising:
    a waveform limiter unit to output, in response to an input of a waveform of the servo burst signal, the waveform after dropping a part exceeding a threshold.

3. A magnetic disk apparatus comprising:
    a medium recording a phase servo signal by a magnetic transfer method; and
    the servo demodulating circuit according to claim 1.

4. The magnetic disk apparatus according to claim 3, wherein the medium is a planar magnetic recording medium.

5. The magnetic disk apparatus according to claim 3, wherein the medium is a perpendicular magnetic recording medium.

6. A servo demodulating circuit in an apparatus for demodulating servo information of a magnetic disk medium recording a phase servo signal by a magnetic transfer method, comprising:
    a register;
    an auto gain control unit to perform auto gain control of the magnetic disk medium based on a preamble of the phase servo signal;
    a clock synchronization unit to synchronize a clock of the magnetic disk medium with that of the apparatus based on the preamble of the phase servo signal;
    a single waveform sampling unit to read into the register a single waveform of a servo burst signal included in the phase servo signal based on a sampling clock synchronized by the clock synchronization unit;
    a single waveform digitizing unit to calculate an amplitude value of the single waveform of the servo burst signal from peak and bottom of the single waveform of the servo burst signal read into the register, and standardize a value of the register based on an amplitude value of the single waveform of the servo burst signal; and
    a phase information calculation unit to calculate phase information of the single waveform of the servo burst signal based on the value of the register standardized by the waveform digitizing unit.

7. The servo demodulating circuit according to claim 6, further comprising:
    a waveform limiter unit to output, in response to an input of a waveform of the servo burst signal, the waveform after dropping a part exceeding a threshold.

8. A magnetic disk apparatus comprising:
    a medium recording the phase servo signal; and
    the servo demodulating circuit according to claim 6.

9. The magnetic disk apparatus according to claim 8, wherein the medium is a planar magnetic recording medium.

10. The magnetic disk apparatus according to claim 8, wherein the medium is a perpendicular magnetic recording medium.

11. A servo demodulating method, performed in an apparatus for demodulating servo information of a magnetic disk medium, recording a phase servo signal by a magnetic transfer method, comprising:
    performing clock synchronization between the magnetic disk medium and the apparatus based on the phase servo signal;
    reading into a register a single waveform of a servo burst signal included in the phase servo signal based on the clock;
    calculating an amplitude value of the single waveform of the servo burst signal from peak and bottom of the single waveform of the servo burst signal read into the register;
    standardizing a value of the register based on an amplitude value of the single waveform of the servo burst signal; and
    calculating phase information of the single waveform of the servo burst signal based on the standardized value of the register.

12. The servo demodulating method according to claim 11, further comprising:
    outputting, in response to an input of a waveform of the servo burst signal, the waveform after dropping a part exceeding a threshold.

* * * * *